Figure 1:
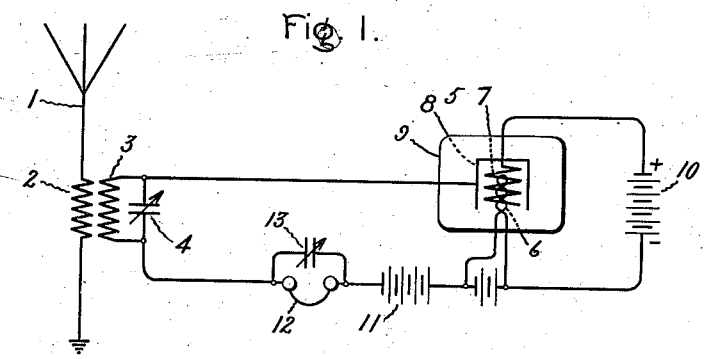

A. W. HULL.
WIRELESS RECEIVING SYSTEM.
APPLICATION FILED MAR. 10, 1917.

1,387,986.

Patented Aug. 16, 1921.

Inventor:
Albert W. Hull,
by
His Attorney.

UNITED STATES PATENT OFFICE.

ALBERT W. HULL, OF SCHENECTADY, NEW YORK, ASSIGNOR TO GENERAL ELECTRIC COMPANY, A CORPORATION OF NEW YORK.

WIRELESS RECEIVING SYSTEM.

1,387,986.  Specification of Letters Patent.  Patented Aug. 16, 1921.

Application filed March 10, 1917. Serial No. 154,024.

*To all whom it may concern:*

Be it known that I, ALBERT W. HULL, a citizen of the United States, residing at Schenectady, county of Schenectady, State of New York, have invented certain new and useful Improvements in Wireless Receiving Systems, of which the following is a specification.

My present invention relates to means for amplifying variable currents and more particularly to means for amplifying currents produced by wireless signals in a receiving antenna.

The object of my invention is to provide an efficient system for producing a high degree of amplification of the feeble currents produced by received signals in a wireless antenna and for detecting the signals thus received.

A further object of my invention is to provide a receiving circuit which will be especially adapted for the reception of continuous wave signals.

It is customary in receiving wireless signals to impress the received oscillations upon a resonant circuit and thereby greatly increase the amplitude of the oscillations produced by the received waves in the antenna. Every oscillating circuit has a so-called damping factor which depends upon the resistance of the circuit and this damping factor limits the maximum possible amplification of the oscillations set up in the circuit. In carrying my invention into effect I provide a device having a negative resistance characteristic and connect this to the oscillating circuit in such a way as to compensate for the positive resistance of the circuit, thereby greatly reducing the damping factor of the circuit and increasing the maximum possible amplification of the oscillations in the circuit.

For receiving continuous wave signals I so adjust the circuit that the negative resistance device produces oscillations of a frequency slightly different from the frequency of the received oscillations. These locally produced oscillations will then be controlled by the received oscillations in such a way as to produce an audible frequency current in the receiving circuit.

By the term "negative resistance device," as used in the specification and claims which follow, I mean to imply a device in which an increase in voltage across the terminals causes a decrease in the current of positive electricity flowing from the positive terminal to the negative terminal through the device, or a device in which the differential coefficient $\frac{dE}{dI}$ is negative where E is voltage across the device and I is the current through the device. The term "current of positive electricity" has been chosen and used in this definition in accordance with the usual conception of current flow, although the current in this case is carried entirely by negative electrons.

Figure 2:
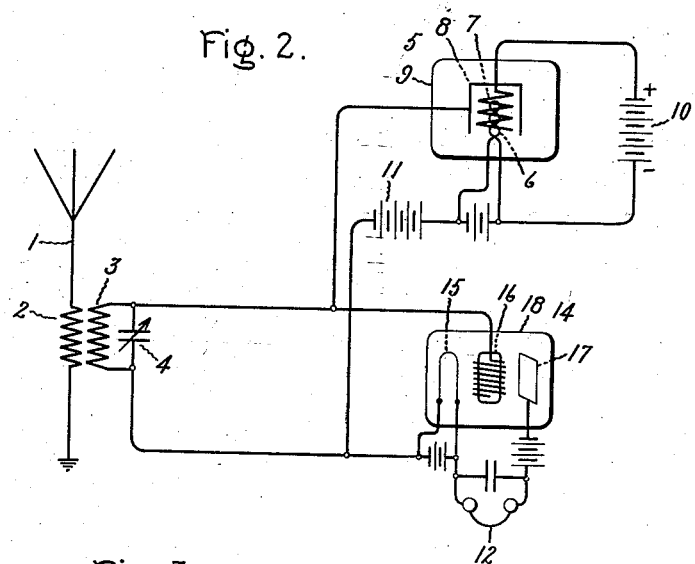
Figure 3:
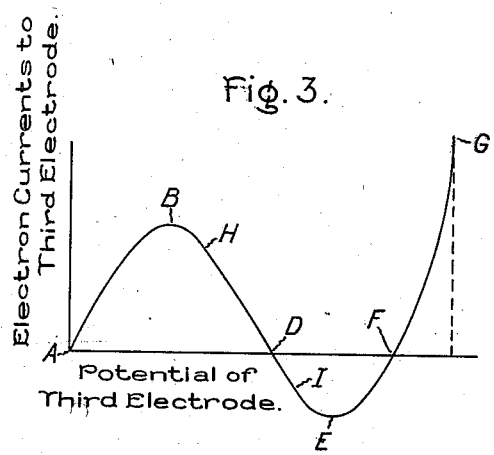

The novel features which I believe to be characteristic of my invention are set forth with particularity in the appended claims. The invention itself, however, together with further objects and advantages thereof will best be understood by reference to the following description taken in connection with the accompanying drawing in which Figure 1 shows diagrammatically a circuit connection in which the negative resistance device serves both as amplifier and detector; Fig. 2 shows a modification in which a separate detector is employed, and Fig. 3 shows the current characteristic of a negative resistance device of the type which I prefer to employ.

As indicated in the drawing my receiving system comprises the usual tuned antenna 1 with an inductance 2 in series therewith. An inductance 3 is coupled to the inductance 2 in the usual manner. Inductance 3 with the variable condenser 4 forms the oscillating circuit upon which the oscillations received by the antenna are impressed. I connect in shunt to the oscillating circuit a negative resistance device 5 of the electron discharge type comprising an electron emitting cathode 6, an anode 7, and a third electrode 8 inclosed in a receptacle 9 evacuated to such a degree that the device is operable at any voltage desired independently of gas ionization. A constant positive potential is impressed upon the anode 7 by means of the battery 10. By varying the potential impressed upon the third electrode 8 the current in the external circuit between cathode and third electrode may be made to vary in the manner indicated by the curve of Fig. 3. For a more complete description of the operation of this device, reference may be had to a paper which I have published at page 141 of the *Physical Review* of January, 1916. It will be noted from an inspection of the curve of Fig. 3 that as the potential of the third electrode is increased up to a value corresponding to the point B on the current curve the current in the external circuit will increase. As the potential is further increased to a value corresponding to the point D the current will decrease from the value B to zero. If the potential is increased to a value corresponding to point E on the current curve the current will flow in a direction opposite to its original direction. Further increase in the potential of the third electrode causes the current to decrease again to zero at the point F and then increase in value in the original direction. The point G on the curve indicates the value of the current when the potential of the third electrode is equal to that of the anode 7. By properly designing the device the greater part of the portion B E of the curve may be made to be practically a straight line. Over this working range the device has a negative resistance characteristic, that is, the current through the device increases as the potential applied thereto decreases.

I have shown mathematically in a paper on "The dynatron" published in the proceedings of the Institute of Radio Engineers, February, 1918, that the damping factor of the system is equal to $\frac{R}{2L} - \frac{1}{2Cr}$, where L and C represent the inductance and capacity respectively of the circuit and R and $r$ the positive numerical values of positive and negative resistance. From this it will be apparent that if the value of the negative resistance is so proportioned to the positive resistance of the circuit that the product of the two is equal to the ratio of the inductance of the capacity, the damping factor of the circuit is zero, that is the resonant value of current or voltage in the circuit is infinite except as it is limited by the length and straightness of the position B E of the current curve of the negative resistance. Since the amplitude of the resonant current in the circuit is limited by the length and straightness of the negative resistance part of the curve, it is evident that if the device is operated in a region very near one end of the curve as at H or I, Fig. 3, the current will be asymmetric and the device may be used as a detector as well as amplifier. The battery 11 supplies the necessary potential for the third electrode in order that it may operate upon the desired portion of the current curve. For the purpose of detecting the signals the usual telephone receiver 12 with a variable condenser 13 across its terminals is inserted in the circuit. The distributed capacity across the turns of the telephone winding offers a low resistance to radio frequencies and hence the telephone does not interfere with the amplication. The high inductance of the telephone, however, will cause the circuit to oscillate at audio frequencies unless its resistance also is very high. The condenser 13 across its terminals, however, if properly adjusted will prevent the setting up of undesirable audio frequency oscillations. The capacity 13 and the negative resistance may be so adjusted as to neutralize the resistance of the telephone for a particular audio frequency, determined by the product of the capacity 13 and the telephone inductance, and if this frequency be made the same as the group frequency of the incoming waves the sensitiveness may be greatly increased. In making this and other adjustments the value of the negative resistance may conveniently be varied by varying the temperature of the cathode 6.

The sensitiveness of the system is the same whether the damping term $\frac{R}{2L} - \frac{1}{2Cr}$ is positive or negative. If this term is negative, however, the system will generate oscillations of its own of a frequency slightly different from the frequency of the oscillations impressed upon the circuit. If the received waves are continuous the amplitude of the locally generated oscillations will be controlled by the received waves in such a way as to produce a desired audio frequency current in the local circuit.

The system which I have described offers an important advantage over the usual receiving circuit in that the coupling between 2 and 3 may be made very close without affecting the selectivity since the necessary condition for high selectivity, namely a small damping factor, may still be present. This is true both for the antenna coupling and the coupling to an auxiliary detector circuit if one is used. The fact that sensitiveness and selectivity are independent of both resistance and coefficient makes it possible to use a much more effective ratio of transformation than is practicable with the receiving systems heretofore employed.

In the system shown in Fig. 2 the negative resistance device 5 is used only as an amplifier and to neutralize the positive resistance of the receiving circuit. In this case an ordinary detector 14 of the electron discharge type is employed comprising the usual filamentary cathode 15, grid 16, and anode 17, inclosed in an evacuated envelop 18. The oscillating receiving circiut is connected to the grid circuit of the detector 14. The increase in voltage on the grid 16 is opposed in most devices of this type by a leakage current which increases with voltage as in a positive resistance and also by the damping in its own circuit and the coupled antenna circuit. The effect of this leakage and damping may be neutralized by connecting the negative resistance device 5 in shunt to the grid circuit as indicated. In this case as in the arrangement of Fig. 1 the damping of the receiving circuit may be made as low as desired.

While in both arrangements described I have shown the negative resistance device as being connected directly to the receiving circuit it is evident that this is not essential as the losses in the circuit may equally well be neutralized by other methods of connection. It will also be apparent that many modifications may be made in the particular apparatus and circuit arrangement employed without departing from the scope of my invention as set forth in the appended claims.

What I claim as new and desire to secure by Letters Patent of the United States, is,—

1. Means for receiving wireless signals comprising a circuit which is resonant to the frequency of the signal waves to be received, and a device closely coupled to said resonant circuit so as to reduce the damping thereof and so proportioned and adjusted as to produce oscillations of a frequency slightly different from that of the received oscillations, said device having a working range over which the current flow therethrough increases and decreases inversely as the potential applied thereto.

2. A wireless receiving circuit comprising inductance and capacity so proportioned that the circuit is resonant to the frequency of the signal waves to be received and a device directly connected in shunt to the said capacity for reducing the damping of the circuit and so proportioned and adjusted as to produce oscillations of a frequency slightly different from that of the received oscillations, said device having a working range over which the current flow therethrough increases and decreases inversely as the potential applied thereto.

3. Means for receiving wireless signals comprising a circuit which is resonant to the frequency of the signal waves to be received and an electron discharge device connected to said resonant circuit, said device comprising an incandescent cathode, an anode and a third electrode and sources of potential of such a value connected to said electrodes that the current flow between cathode and third electrode varies inversely as the potential difference between the same.

4. A wireless receiving circuit comprising inductance and capacity so proportioned that the circuit is resonant to the frequency of the signal waves to be received and an electron discharge device connected in shunt to said capacity, said device comprising an incandescent cathode, an anode and a third electrode, and sources of potential of such values connected to said electrodes that the current flow between cathode and third electrode varies inversely as the potential difference between the same.

5. The combination of a wireless receiving circuit and means operatively related to said circuit for reducing the damping thereof, said means comprising a device having a plurality of electrodes inclosed in an evacuated envelop and having a working range over which the current flow therethrough increases and decreases inversely as the potential applied thereto, said envelop being evacuated to such a degree that the device is operable over said working range independently of gas ionization.

6. Means for receiving wireless signals comprising a circuit which is resonant to the frequency of the signal waves to be received and a negative resistance device operatively related to said circuit for reducing the damping thereof, said device having a working range over which the circuit flow therethrough varies inversely as the potential applied thereto and comprising an incandescent cathode, an anode and a third electrode inclosed in an envelop evacuated to such a degree that the device is operable over said working range independently of gas ionization.

7. Means for detecting wireless signals comprising an electron discharge device which is operable independently of gas ionization and which has a working range over which the current flow therethrough varies inversely as the potential applied thereto and a source of potential connected to said device of such value that the normal current therethrough has a value near one of the limits of said working range.

8. A wireless receiving system comprising a circuit which is resonant to the frequency of the waves to be received, a negative resistance device connected to said circuit for reducing the damping thereof, indicating means in series with said negative resistance and means for adjusting the circuit so that it will be resonant to a desired audio frequency.

9. The combination in a wireless signaling system of a receiving circuit which is resonant to the frequency of the waves to be received and a negative resistance device connected to said circuit, the value of said negative resistance being so related to the capacity, inductance and positive resistance of the circuit that oscillations will be produced of a slightly different frequency which will combine with the received oscillations to produce beats and said negative resistance device having a working range over which the current flow therethrough increases and decreases inversely as the potential applied thereto.

10. Means for detecting high frequency signals comprising an electron discharge device which has a working range over which the current flow therethrough varies inversely as the potential applied thereto and a source of potential connected to said device of such a value that the normal current therethrough has a value near one of the limits of said working range.

11. The combination in a receiving system of a circuit upon which signaling waves are impressed and means operatively related to said circuit for reducing the damping thereof, said means comprising a device having a plurality of electrodes inclosed in an evacuated envelop and having a working range over which the current flow therethrough increases and decreases inversely as the potential applied thereto.

12. Means for receiving high frequency signals comprising a circuit upon which signaling waves may be impressed and an electron discharge device associated with said circuit, said device comprising an electron emitting cathode, an anode and a third electrode and sources of potential of such a value connected to said electrodes that the current flow between cathode and third electrode varies inversely as the potential difference between the same.

In witness whereof, I have hereunto set my hand this 9th day of March, 1917.

ALBERT W. HULL.